(12) United States Patent
Nagano et al.

(10) Patent No.: US 7,445,667 B2
(45) Date of Patent: Nov. 4, 2008

(54) ALUMINUM FLAKE PIGMENT

(75) Inventors: Keita Nagano, Ikoma-gun (JP); Takao Mizoshita, Yao (JP)

(73) Assignee: Toyo Aluminium Kabushiki Kaisha, Osaka-shi (JP)

(*) Notice: Subject to any disclaimer, the term of this patent is extended or adjusted under 35 U.S.C. 154(b) by 0 days.

(21) Appl. No.: 11/820,015

(22) Filed: Jun. 14, 2007

(65) Prior Publication Data

US 2007/0240616 A1    Oct. 18, 2007

Related U.S. Application Data

(62) Division of application No. 10/488,804, filed on Mar. 4, 2004.

(51) Int. Cl.
  C09C 1/64    (2006.01)
  C09C 3/04    (2006.01)
  C09C 3/08    (2006.01)
(52) U.S. Cl. ........................... 106/404; 428/457
(58) Field of Classification Search ......... 106/404; 428/457
  See application file for complete search history.

(56) References Cited

U.S. PATENT DOCUMENTS

| | | | |
|---|---|---|---|
| 3,995,815 A | 12/1976 | Megelas | |
| 4,049,610 A | 9/1977 | Bunge et al. | |
| 4,213,886 A * | 7/1980 | Turner | 524/850 |
| 4,936,913 A | 6/1990 | Hieda | |
| 5,024,387 A | 6/1991 | Yeh | |
| 5,127,951 A | 7/1992 | Imasato et al. | |
| 5,800,607 A | 9/1998 | Schnaitmann et al. | |
| 6,398,999 B1 * | 6/2002 | Josephy et al. | 264/81 |
| 6,454,847 B1 * | 9/2002 | Iri et al. | 106/404 |
| 6,464,769 B2 | 10/2002 | Chattopadhyay et al. | |
| 6,821,622 B1 * | 11/2004 | Clough | 428/403 |
| 6,863,851 B2 * | 3/2005 | Josephy et al. | 264/81 |
| 7,163,580 B2 * | 1/2007 | Minami | 106/404 |
| 7,223,476 B2 * | 5/2007 | Edwards et al. | 428/407 |
| 2006/0034787 A1 * | 2/2006 | Bujard | 424/63 |

FOREIGN PATENT DOCUMENTS

| | | | |
|---|---|---|---|
| EP | 1 080 810 | | 3/2001 |
| GB | 183134 | | 1/1923 |
| JP | 51-024635 | | 2/1976 |
| JP | 03-294360 | | 12/1991 |
| JP | 05-500326 | | 1/1993 |
| JP | 08-170034 | | 7/1996 |
| JP | 09-194756 | | 7/1997 |
| JP | 11-106686 A | * | 4/1999 |
| JP | 11-152423 | | 6/1999 |
| JP | 11-319607 | | 11/1999 |
| JP | 2000-273350 | | 10/2000 |
| JP | 2000-301058 A | * | 10/2000 |
| JP | 2001-180933 | | 7/2001 |
| JP | 2002-126547 | | 5/2002 |
| JP | 2002-179421 | | 6/2002 |
| WO | WO 91/01182 | | 2/1991 |
| WO | WO 99/54074 | | 10/1999 |

OTHER PUBLICATIONS

Chemical Abstract No. 121:17699, abstract of an article by Shiozawa et al entitled "Applications of optically-arranged metal acrylic films for super-covering makeups", Journal of SCCJ, (1993), 27(3), 326-37, no month.*
Machine translation of Japanese Patent Specification JP 11-152423A, application published (Jun. 1999).*
Asakura Publishing Co., Ltd., "Ganryo no Jiten (Pigment Dictionary)", First Edition, First Printing, Sep. 25, 2000, p. 443 (with partial English translation).

* cited by examiner

*Primary Examiner*—Anthony J Green
(74) *Attorney, Agent, or Firm*—W. F. Fasse; W. G. Fasse

(57) ABSTRACT

An aluminum flake pigment suitable for use in metallic paints, metallic inks and the like is finely flaked in a grinder to include small aluminum flakes with a maximum dimension of not more than 10 μm, wherein these small aluminum flakes have a mean aspect ratio from 8 to 20. Overall, the aluminum flakes of the aluminum flake pigment preferably have a mean particle size from 3 to 20 μm. The grinder produces the aluminum flake pigment by flaking an aluminum powder in an organic solvent using steel ball grinding media having diameters of 0.3 to 1.0 mm.

9 Claims, 1 Drawing Sheet

ALUMINUM FLAKE PIGMENT

CROSS-REFERENCE TO RELATED APPLICATION

This application is a Divisional of U.S. application Ser. No. 10/488,804 filed Mar. 4, 2004, the entirety of which is incorporated herein by reference.

TECHNICAL FIELD

The present invention relates to an aluminum flake pigment employed for a high-quality metallic paint or the like and a method of manufacturing the same. More detailedly, the present invention relates to an aluminum flake pigment having extremely high brightness and denseness employed for a high-quality metallic paint composition used for automotive finish and parts, an industrial machine, furniture, a household appliance or the like, a high-quality metallic ink composition used for gravure printing, offset printing or the like and a metallic compound plastic resin composition and a method of manufacturing the same.

The present invention also relates to grinding media used in the aforementioned method of manufacturing the aluminum flake pigment.

BACKGROUND TECHNIQUE

An aluminum flake pigment is used in wide-ranging fields as a metallic pigment contained in a paint composition, an ink composition or a resin composition.

In general, the aluminum flake pigment is obtained by wet-milling aluminum powder serving as a raw material together with a grinding lubricant and an organic solvent using a grinder or pulverizer such as a ball mill or an attriter having grinding media thereby flaking the aluminum powder.

The metallic effect of a paint film mainly depends on the shape, the surface smoothness the mean particle size, the particle size distribution, the average thickness, the thickness distribution, the aspect ratio etc. of the aluminum flake pigment, which are adjusted by a combination of the characteristics of the raw aluminum powder and grinding conditions.

While the metallic effect is visually recognized as the combination of brightness, lightness, sparkling effect and the like, there has generally been a strong tendency among demanders to desire a paint film having high brightness. In general, the brightness of the paint film and the mean particle size of the aluminum flake pigment are so correlative with each other that the brightness is increased as the mean particle size is increased.

If the aluminum flake pigment has a large mean particle size, however, the orientation of the aluminum flake pigment tends to be irregular in formation of the paint film, the aluminum flake pigment may protrude from the paint film to give seeding on the surface of the paint film, and the paint film may excessively glitter to result in an unpreferable design.

Therefore, development of an aluminum flake pigment having a small mean particle size as well as high brightness is desired, and development efforts are made in various scenes.

For example, Japanese Patent Laying-Open No. 8-170034 discloses that it is possible to provide a paint film simultaneously with strong brightness and an excellent appearance by a metallic pigment composition containing (A) 100 parts by solid weight of film-forming resin and (B) 0.1 to 30 parts by weight of an aluminum flake pigment having a mean particle size (D50) in the range of 20±5 μm, an average particle thickness (t) in the range of 0.5 to 1 μm and a gradient (n) of at least 2.7 in a Rosin-Rammler diagram.

Further, Japanese Patent Laying-Open No. 11-152423 discloses an aluminum flake pigment exhibiting high brightness and excellent circulation resistance, having an average aluminum flake thickness (t) in the range of 0.2 to 0.7 μm, a mean particle size (D50) in the range of 4 to 20 μm, an aspect ratio (D50/t) in the range of 15 to 50 and an uniformity index (n) of at least 2.4.

Also when the aluminum flake pigment disclosed in either gazette is employed, however, the requirement for an aluminum flake pigment having a small mean particle size as well as high brightness is not yet sufficiently satisfied.

DISCLOSURE OF THE INVENTION

On the basis of the aforementioned present circumstances, an object of the present invention is to provide an aluminum flake pigment having a small mean particle size as well as high brightness and a method of manufacturing the same.

Another object of the present invention is to provide grinding media used for the said manufacturing method.

In order to attain the aforementioned objects, the inventors have minutely studied the relation between the shape, the surface smoothness, the mean particle size, the particle size distribution, the average thickness, the thickness distribution, the aspect ratio etc. of an aluminum flake pigment and the brightness of a paint film containing this aluminum flake pigment. Consequently, the inventors have found that a principle factor reducing the brightness of the paint film is the presence of insufficiently flaked fine aluminum particles.

In other words, the inventors have found that the brightness is reduced if insufficiently flaked fine aluminum particles are present, also when using an aluminum flake pigment having sharp particle size distribution by adjusting the mean particle size or the aspect ratio of the aluminum flake pigment in a constant range or regulating the uniformity index (n) by a Rosin-Rammler diagram.

Therefore, the inventors have made deep consideration on the basis of the aforementioned fact to reach such an idea that the insufficiently flaked fine aluminum particles inevitably remaining in the generally known method of manufacturing an aluminum flake pigment may be further flaked in order to solve the aforementioned problem, and made deep. studies. Consequently, the inventors have found that the insufficiently flaked fine aluminum particles can be further flaked by flaking aluminum powder in an organic solvent with a grinder having grinding media having a specific material, a specific shape and a specific diameter.

The inventors have further found that the effect of flaking the fine aluminum particles can be further increased by flaking aluminum powder having a specific mean particle size under specific grinding conditions.

In other words, the present invention is directed to a method of manufacturing an aluminum flake pigment including a step of flaking aluminum powder in an organic solvent-with a grinder having grinding media, while the grinding media contain steel ball grinding media formed by spherical media consisting of a material including steel and having diameters in the range of 0.3 mm to 1.0 mm.

The mean particle size ($D50_{Al}$) of this aluminum powder is preferably in the range of 1.0 to 10.0 μm, and particularly preferably in the range of 1.0 to 6.0 μm. Further, the ratio ($D50_{Al}/D_B$) of the mean particle size ($D50_{Al}$) of this aluminum powder to the average diameter ($D_B$) of these steel ball grinding media is preferably in the range of 0.001 to 0.02, and particularly preferably in the range of 0.0015 to 0.008. In addition, the ratio ($W_{Al}/W_{sol}$) of the mass ($W_{Al}$(kg)) of this aluminum powder to the volume ($W_{sol}$(L)) of this organic solvent is preferably in the range of 0.1 to 0.3.

This grinder is preferably a ball mill. Further, the rotational frequency of this ball mill is preferably not more than 95% of the critical rotational frequency.

The present invention further includes an aluminum flake pigment manufactured by the aforementioned method of manufacturing an aluminum flake pigment.

Further, the present invention includes an aluminum flake pigment exhibiting a mean aspect ratio of aluminum flake particles having diameters of not more than 10 μm in the range of 8 to 20 among aluminum flake particles contained in this aluminum flake pigment. In addition, this mean aspect ratio is further preferably in the range of 9 to 15 in particular. The mean particle size of these aluminum flake particles contained in the aluminum flake pigment is preferably in the range of 3 to 20 μm.

Further, such an aluminum flake pigment can be manufactured by a method of manufacturing an aluminum flake pigment including a step of flaking aluminum powder in an organic solvent with a grinder having grinding media containing steel ball grinding media formed by spherical media consisting of a material including steel and having diameters in the range of 0.3 mm to 1.0 mm, for example.

In addition, the present invention includes steel ball grinding media formed by spherical media consisting of a material including steel and having diameters in the range of 0.3 mm to 1.0 mm.

BEST MODE FOR CARRYING OUT THE INVENTION

Figure 1:
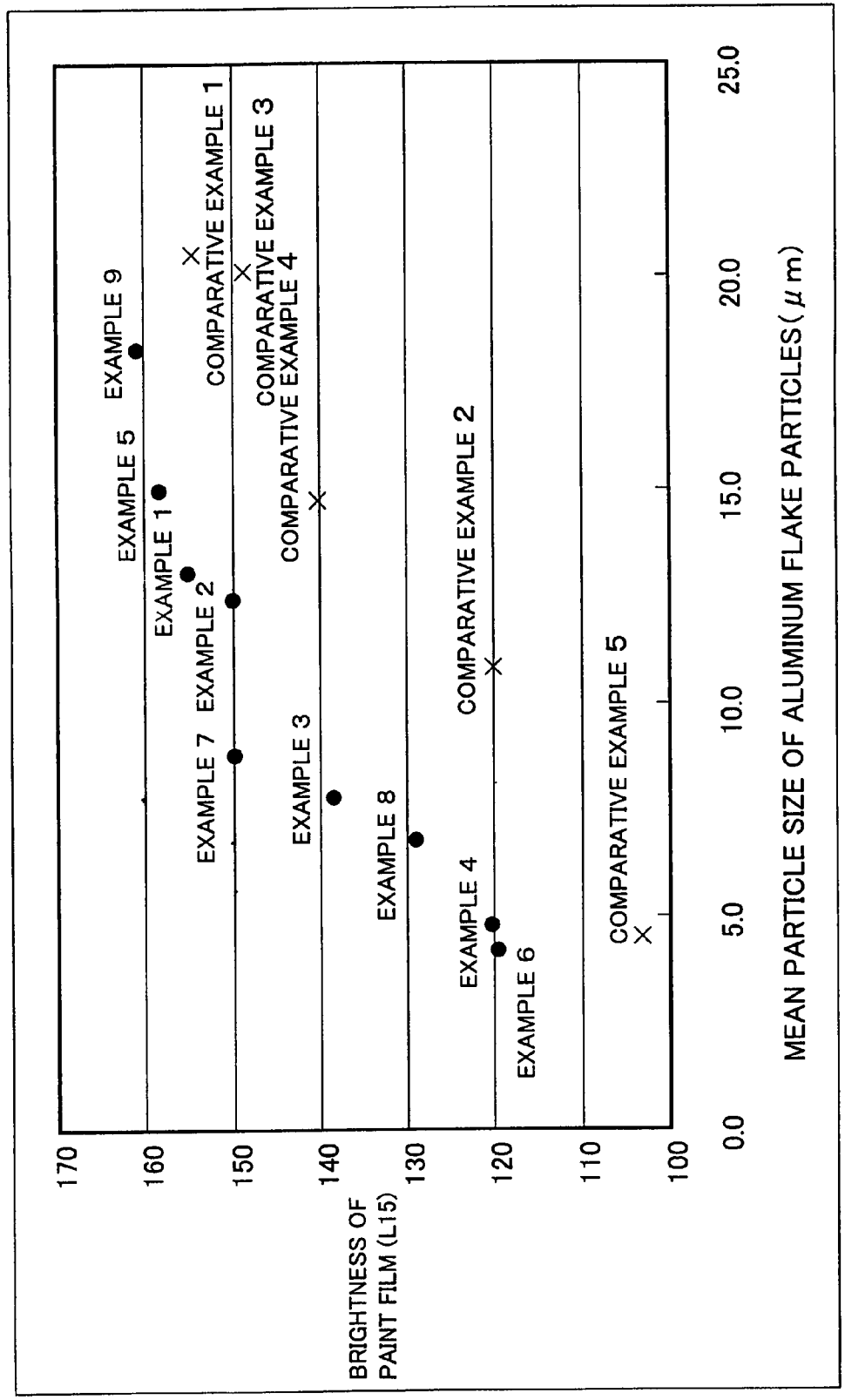
FIG. 1 is a graph showing the relation between mean particle sizes of inventive aluminum flake pigments and brightness of paint films containing these aluminum flake pigments.

The present invention is now described in further detail by showing an embodiment.

The present invention is directed to a method of manufacturing an aluminum flake pigment including a step of flaking aluminum powder in an organic solvent with a grinder having grinding media, while the grinding media contain steel ball grinding media formed by spherical media consisting of a material including steel and having diameters in the range of 0.3 mm to 1.0 mm.

<Material, Shape and Diameter of Grinding Media>

The grinding media employed in the present invention must contain steel ball grinding media formed by spherical media consisting of a material including steel and having diameters in the range of 0.3 mm to 1.0 mm, in consideration of specific gravity and economy. However, the said steel ball grinding media formed by spherical media may not be true spherical media but may be substantially spherical media. The said grinding media particularly preferably contain steel ball grinding media having diameters in the range of 0.5 to 0.8 mm.

In order to flakily grind (referred to as flake in this specification) fine aluminum powder, it is effective to reduce the diameters of the grinding media to the range of 0.3 mm to 1.0 mm. If grinding media having diameters exceeding 1.0 mm occupy most part, the fine aluminum powder is trapped between the grinding media and this aluminum powder is hardly ground and not efficiently flaked. If grinding media having diameters of less than 0.3 mm occupy most part, on the other hand, the weight of the steel ball grinding media is so small that grinding force is deteriorated, the grinding time is too long and the aluminum powder cannot be substantially ground.

At least two types of grinding media having different diameters may be mixed with each other for preparing the said grinding media. The grinder employed in the present invention may include grinding media having diameters exceeding 1.0 mm. In other words, it is important in the inventive manufacturing method to flake aluminum powder with grinding media containing grinding media having diameters of 0.3 to 1.0 mm. The quantity of the grinding media having diameters of 0.3 to 1.0 mm may be varied with the quantity of raw aluminum powder introduced into the grinder.

<Mean Particle Size of Raw Aluminum Powder>

The mean particle size ($D50_{Al}$) of the raw aluminum powder employed in the present invention is preferably in the range of 1.0 to 10.0 μm, and more preferably in the range of 1.0 to 6.0 μm.

If the mean particle size $D50_{Al}$ exceeds 10.0 μm, the diameter of the ground aluminum flake pigment is so increased that the orientation of the aluminum flake pigment may be disarranged in formation of a paint film, the surface of the paint film may include seeding due to protrusion of aluminum flake pigment particles, and the paint film may excessively glitter to result in an unpreferable design depending on the application. If the mean particle size $D50_{Al}$ is less than 1.0 μm on the other hand, there is such a tendency that the aluminum powder cannot be efficiently flaked and sufficient film brightness cannot be attained also when using grinding media having diameters in the range of 0.3 to 1.0 mm.

<Ratio of Mean Particle Size of Raw Aluminum Powder to Diameter of Grinding Media>

In the manufacturing method according to the present invention, the ratio ($D50_{Al}/D_B$) of the mean particle size ($D50_{Al}$) of the raw aluminum powder to the average diameter ($D_B$) of the steel ball grinding media is preferably in the range of 0.001 to 0.02, and more preferably in the ratio of 0.0015 to 0.008. When the value of the ratio $D50_{Al}/D_B$ is in the said range, the effect of flaking fine aluminum powder is further increased.

If the value of the ratio $D50_{Al}/D_B$ is less than 0.001, gaps between the steel ball grinding media are excessively large as compared with the raw aluminum powder and hence there is such a tendency that the raw aluminum powder is hardly efficiently flaked. If the value of the ratio $D50_{Al}/D_B$ exceeds 0.02, on the other hand, the steel ball grinding media are so excessively small for the raw aluminum powder that the raw aluminum powder cannot be efficiently ground due to insufficient grinding force correlative with the mass of each grinding medium, and there is such a tendency that unflaked fine powder of aluminum remains to reduce the brightness of the paint film.

<Ratio of Mass of Raw Aluminum Powder to Volume of Organic Solvent>

In the manufacturing method according to the present invention, the ratio ($W_{Al}/W_{sol}$) of the mass ($W_{Al}$(kg)) of the raw aluminum powder to the volume ($W_{sol}$(L)) of the organic solvent is preferably in the range of 0.1 to 0.3, and more preferably in the range of 0.14 to 0.20. If the value of the ratio $W_{Al}/W_{sol}$ is less than 0.1, the raw aluminum powder migrates due to reduction of slurry viscosity in grinding, and there is such a tendency that the raw aluminum powder cannot be uniformly ground. If the value of the ratio $W_{Al}/W_{sol}$ exceeds 0.3, on the other hand, the viscosity of the slurry in grinding is so excessively increased that movement of the grinding media is suppressed, and there is such a tendency that the raw aluminum powder cannot be uniformly flaked.

<Rotational Frequency of Ball Mill Used as Grinder>

In the manufacturing method according to the present invention, the type of the grinder is not particularly limited but a generally known grinder can be preferably used, while an attriter-type grinder comprising a rotating arm therein or a cylindrical ball mill can be preferably employed, for example. Among such grinders, it is particularly preferable to employ the cylindrical ball mill in consideration of the quality and productivity.

When employing a ball mill in the manufacturing method according to the present invention, the rotational frequency of the ball mill is preferably set to not more than 95% of the critical rotational frequency. The term "critical rotational frequency", denoting such a frequency level that balls are centrifugally fixed to the inner wall of the ball mill if the rotational frequency exceeds this level, is expressed in the following equation (1):

$$n = 1/(2\pi) \times (g/r)^{1/2} \qquad (1)$$

(In the equation (1), n represents the rotational frequency (rpm), g represents gravitational acceleration (3,528,000 cm/min$^2$) and r represents the radius (cm) of the ball mill).

If the rotational frequency of the ball mill exceeds 95% of the critical rotational frequency, a pulverizing effect is so increased among grinding effects that sufficient flaking cannot be attained but large flake particles are parted into ultrafine particles, and hence there is such a tendency that the brightness of the paint film is reduced. If the rotational frequency of the ball mill approaches the critical rotational frequency, impact force resulting from collision of the grinding media is increased, and there is such a tendency that the lives of the grinding media are reduced to result in difficulty of continuous use. This is because steel balls of not more than 1 mm in diameter are generally formed with no hardened films on the surfaces thereof. It is possible to elongate the lives of the grinding media by keeping the rotational frequency of the ball mill not more than 95% of the critical rotational frequency.

<Aspect Ratio of Fine Aluminum Flake Pigment>

In the aluminum flake pigment according to the present invention, the mean aspect ratio of aluminum flake particles having diameters of not more than 10 μm contained in the aluminum flake pigment is preferably at least 8. This mean aspect ratio of the aluminum flake particles is more preferably at least 9. If this mean aspect ratio is less than 8, fine aluminum flake particles are so insufficiently flaked that the paint film is consequently rendered turbid and reduced in brightness, leading to an inferior design.

This mean aspect ratio is preferably not more than 20, and more preferably not more than 15 in particular. If this mean aspect ratio exceeds 20, bending or breakage of the aluminum flake particles results in circulation for preparing a paint film, and there is such a tendency that the so-called circulation resistance is reduced.

In the aforementioned method of manufacturing an aluminum flake pigment according to the present invention, the condition that the mean aspect ratio of aluminum flake particles having diameters of not more than 10 μm contained in the obtained aluminum flake pigment exceeds 8 is satisfied unless this manufacturing method is carried out under conditions damaging the effects of the present invention or a step damaging the effects of the present invention is added to this manufacturing method.

<Mean Particle Size of Aluminum Flake Pigment>

The mean particle size of the aluminum flake pigment according to the present invention is preferably in the range of 3 to 20 μm, and more preferably in the range of 5 to 15 μm.

There is such a tendency that the brightness of the paint film is insufficient if the mean particle size is less than 3 μm, while the sparkling effect of the paint film may be unpreferably excessively enhanced if the mean particle size exceeds 20 μm.

<Other Grinding Conditions>

In the manufacturing method according to the present invention, grinding is preferably performed under the presence of a grinding lubricant. While the grinding lubricant is not particularly limited but a generally known lubricant is usable, aliphatic acid such as oleic acid or stearic acid, aliphatic amine, aliphatic amide, aliphatic alcohol, an ester compound or the like can be preferably used, for example.

The said grinding lubricant has an effect of suppressing unnecessary oxidation on the surface of the aluminum flake pigment and improving the gloss. The content of the grinding lubricant in grinding is preferably in the range of 0.1 to 20 parts by mass with respect to 100 parts by mass of the raw aluminum powder, and more preferably in the range of 0.5 to 10 parts by mass. The aluminum flake pigment may agglomerate to reduce the surface gloss of the aluminum flake pigment if the content of the grinding lubricant is less than 0.1 parts by mass, while the physical property of the paint may be reduced if the content of the grinding lubricant exceeds 20 parts by mass.

In the manufacturing method according to the present invention, the ratio of the quantity of the raw aluminum powder to the quantity of the grinding media in grinding is preferably in the range of 20 to 200. The productivity is reduced if the said ratio is less than 20, while the grinding time is extremely elongated and the slurry viscosity is so excessively increased during grinding that the aluminum powder cannot be efficiently ground if the said ratio exceeds 200.

While the organic solvent in grinding is not particularly limited but a generally known organic solvent is usable in the manufacturing method according to the present invention, a hydrocarbon solvent such as a mineral spirit or a solvent naphtha or an alcohol, ether or ester solvent can be used, for example. In general, a high-boiling hydrocarbon solvent is preferably used in consideration of a safety problem such as flammability to the solvent in grinding.

While the present invention is now described in more detail with reference to Examples, the present invention is not restricted to these Examples.

EXAMPLE 1

40 kg of steel balls having diameters of 0.7 mm serving as grinding media, 800 g of raw aluminum powder having a mean particle size of 4.6 μm, 4 L of a mineral spirit serving as an organic solvent and 500 g of oleic acid serving as a grinding lubricant were introduced into a cylindrical ball mill of 500 mm in diameter and 180 mm in length respectively, and ground for 13 hours at a rotational frequency of 41 rpm (68% of the critical rotational frequency).

After termination of the grinding step, a slurry was washed out from the ball mill with the mineral spirit and successively passed through vibrating screens of 150 meshes, 350 meshes and 400 meshes so that the passed slurry was solid-liquid separated through a pan filter. The obtained filter cake (solid content: 85%) was thereafter introduced into a kneader mixer and kneaded for 1 hour, to obtain an aluminum flake pigment (solid content: 80%).

EXAMPLES 2 TO 9 AND COMPARATIVE EXAMPLES 1 to 5

Aluminum flake pigments were obtained by a method similar to that in Example 1 except the diameters of steel balls, the mean particle sizes and the applied quantities of used aluminum powder materials, the quantities of mineral spirits, the rotational frequencies and the grinding 10 times. Tables 1 to 3 show the respective conditions.

TABLE 1

|  |  | Symbol (unit) | Example 1 | Example 2 | Example 3 | Example 4 |
|---|---|---|---|---|---|---|
| Manufacturing Conditions | Raw Aluminum Powder | $W_{Al}$ (kg) | 0.8 | 0.8 | 0.8 | 0.8 |
|  |  | $D50_{Al}$ (μm) | 4.6 | 3.6 | 2.1 | 1.2 |
|  | Mineral Spirit | $W_{sol}$ (l) | 4.0 | 5.6 | 5.6 | 5.6 |
|  | Rotational Frequency | (rpm/% vs. critical rotational frequency) | 41/68 | 41/68 | 41/68 | 41/68 |
|  | Grinding Time | (hours) | 13 | 13 | 13 | 15 |
|  | Quantity of Steel Balls | (kg) | 40 | 40 | 40 | 40 |
|  | Diameter of Steel Balls | $D_B$ (mm) | 0.7 | 0.7 | 0.7 | 0.7 |
|  |  | $D50_{Al}/D_B$ | 0.0066 | 0.0051 | 0.0030 | 0.0017 |
|  |  | $W_{Al}/W_{sol}$ | 0.200 | 0.143 | 0.143 | 0.143 |
| Performance Evaluation | Brightness of Paint Film | L15 | 155.1 | 150.0 | 138.3 | 120.2 |
|  | Mean Particle Size of Flakes | (μm) | 13.1 | 12.5 | 7.8 | 4.8 |
|  | Mean Aspect Ratio of Particles of not more than 10 μm |  | 9.4 | 9.2 | 9.0 | 8.1 |
|  | Sparkling Effect of Paint Film |  | unremarkable | unremarkable | unremarkable | no |

TABLE 2

|  |  | Symbol (unit) | Example 5 | Example 6 | Example 7 | Example 8 | Example 9 |
|---|---|---|---|---|---|---|---|
| Manufacturing Conditions | Raw Aluminum Powder | $W_{Al}$ (kg) | 0.8 | 0.8 | 1.5 | 0.8 | 0.8 |
|  |  | $D50_{Al}$ (μm) | 6.0 | 1.0 | 3.6 | 1.0 | 10.0 |
|  | Mineral Spirit | $W_{sol}$ (l) | 5.6 | 5.6 | 5.0 | 5.6 | 5.6 |
|  | Rotational Frequency | (rpm/% vs. critical rotational frequency) | 41/68 | 41/68 | 41/68 | 41/68 | 41/68 |
|  | Grinding Time | (hours) | 16 | 15 | 20 | 13 | 20 |
|  | Quantity of Steel Balls | (kg) | 40 | 40 | 40 | 40 | 40 |
|  | Diameter of Steel Balls | $D_B$ (mm) | 1.0 | 0.5 | 0.5 | 1.0 | 0.5 |
|  |  | $D50_{Al}/D_B$ | 0.0060 | 0.0020 | 0.0072 | 0.0010 | 0.0200 |
|  |  | $W_{Al}/W_{sol}$ | 0.143 | 0.143 | 0.300 | 0.143 | 0.143 |
| Performance Evaluation | Brightness of Paint Film | L15 | 158.3 | 119.6 | 149.8 | 129.0 | 160.7 |
|  | Mean Particle Size of Flakes | (μm) | 15.0 | 4.2 | 8.8 | 6.8 | 18.3 |
|  | Mean Aspect Ratio of Particles of not more than 10 μm |  | 9.1 | 8.0 | 9.0 | 8.1 | 8.9 |
|  | Sparkling Effect of Paint Film |  | unremarkable | no | unremarkable | no | unremarkable |

TABLE 3

|  |  | Symbol (unit) | Comparative Example 1 | Comparative Example 2 | Comparative Example 3 | Comparative Example 4 | Comparative Example 5 |
|---|---|---|---|---|---|---|---|
| Manufacturing Conditions | Raw Aluminum Powder | $W_{Al}$ (kg) | 0.8 | 0.8 | 1.0 | 1.0 | 0.8 |
|  |  | $D50_{Al}$ (μm) | 3.8 | 2.2 | 7.5 | 3.4 | 3.6 |
|  | Mineral Spirit | $W_{sol}$ (l) | 4.6 | 4.4 | 5.0 | 6.1 | 5.6 |
|  | Rotational | (rpm/% vs. | 49/82 | 49/82 | 41/68 | 41/68 | 41/68 |

TABLE 3-continued

|  |  | Symbol (unit) | Comparative Example 1 | Comparative Example 2 | Comparative Example 3 | Comparative Example 4 | Comparative Example 5 |
|---|---|---|---|---|---|---|---|
|  | Frequency | critical rotational frequency) |  |  |  |  |  |
|  | Grinding Time | (hours) | 10 | 10 | 10 | 10 | 20 |
|  | Quantity of Steel Balls | (kg) | 40 | 40 | 50 | 50 | 40 |
|  | Diameter of Steel Balls | $D_B$ (mm) | 1.2 | 1.2 | 1.5 | 1.5 | 0.2 |
|  |  | $D50_{Al}/D_B$ | 0.0032 | 0.0018 | 0.0050 | 0.0023 | 0.0180 |
|  |  | $W_{Al}/W_{sol}$ | 0.174 | 0.182 | 0.200 | 0.164 | 0.143 |
| Performance Evaluation | Brightness of Paint Film | L15 | 154.6 | 120.1 | 148.7 | 140.1 | 103.2 |
|  | Mean Particle Size of Flakes | (μm) | 20.5 | 10.8 | 20.1 | 14.8 | 4.5 |
|  | Mean Aspect Ratio of Particles of not more than 10 μm |  | 6.5 | 5.4 | 7.0 | 7.2 | 5.7 |
|  | Sparkling Effect of Paint Film |  | strong | unremarkable | strong | slightly unremarkable | no |

<Preparation of Paint Plate>

14.29 g of each of the aluminum flake pigments (metallic mass) obtained in Examples 1 to 9 and comparative examples 1 to 5 was added to 100 g of thinner, dispersed with a glass rod and stirred/separated for 15 minutes through a paint shaker along with 80 g of A322 (acrylic clear resin by DIC) and 16.66 g of L-117-60 (melamine resin by DIC). The viscosity of the obtained paint composition was adjusted to 13.5 seconds in a ford cup with addition of thinner, to adjust a paint composition containing each of the aluminum flake pigments obtained in Examples 1 to 7 and comparative examples 1 to 5.

420 g of A345 (acrylic clear resin by DIC) and 165 g of L-117-60 (melamine resin by DIC) were added to 228 g of Solvesso 100 (aromatic solvent by Exxon Chemical), dispersed with a glass rod, and the viscosity of the mixture was thereafter adjusted to 20 seconds in a ford cup with further addition of Solvesso 100, to prepare a top coat.

The said paint compositions containing the aluminum flake pigments obtained in Examples 1 to 9 and comparative examples 1 to 5 were spread on steel plates with an automatic spray coating machine (model 310741 by FT. LAUDERDALE) under the following conditions of application:

| [Conditions of Application] |  |
|---|---|
| Traverse Dwell Time | 3 sec. |
| Flash Time for the Same Gun | 18 sec. |
| Traveling Speed of Gun | 1500 sec. |
| Index Distance | 2 |
| Time for Gun Change from Base to Top Coat | 180 sec. |
| Pass Frequency of the Same Paint (Base) | 4 passes |
| Pass Frequency of the Same Paint (Top) | 4 passes |
| Direction of Movement of Spray | L-R-L |
| Atomization Pressure | 4.0 kg/cm$^2$ |
| Discharge (Base) | 4 + ⅜R-OPEN |
| Discharge (Top) | Full Admission |
| Pattern (Base and Top) | 2R-OPEN |

Thereafter the plates having the paint compositions applied thereto were stood still for 30 minutes, and subjected to first baking under conditions of a temperature of 80° C. and a time of 5 minutes and second baking under conditions of a temperature of 140° C. and a time of 25 minutes, to obtain paint plates containing the aluminum flake pigments obtained in Examples 1 to 9 and comparative examples 1 to 5 respectively.

<Performance Evaluation>

The mean aspect ratios of aluminum flake particles having diameters of not more than 10 μm contained in the aluminum flake pigments obtained in Examples 1 to 9 and comparative examples 1 to 5 were measured. Further, L values of the said paint plates containing these aluminum flake pigments were measured with a varied angle colorimeter (MA-68 by X-Rite) at an incident angle of 45° and an offset angle of 15° from a specular direction, thereby evaluating the brightness of paint films. Sparkling effect of the paint films was also visually evaluated. Tables 1 to 3 show the results. FIG. 1 shows the relation between the mean particle sizes of aluminum flake particles contained in these aluminum flake pigments and the L values. The brightness is increased as the L value is increased.

Among the numerals in Tables 1 to 3, the mean particle sizes of the raw aluminum powder and the aluminum flake pigments were measured with a laser diffraction particle size distribution measurer (Microtrack HRA by Honeywell) under the following conditions:

(i) For Raw Aluminum Powder 0.5 g of the raw aluminum powder was mixed with 0.01 g of hexamethaphosphoric acid and the mixture was stirred with a glass rod, introduced into circulating water in a system of measurement and supersonically dispersed for 2 minutes, for thereafter measuring the mean particle size.

(ii) For Aluminum Flake Pigment 0.5 g of aluminum paste, 1.0 g of Triton x-100 (nonionic-surface active agent by Union Carbide Corporation) and 5.0 g of ethylene glycol were mixed with each other and the mixture was stirred with a glass rod, introduced into circulating water in a system of measurement and supersonically dispersed for 30 seconds, for thereafter measuring the mean particle size.

The mean aspect ratio of aluminum flake particles having diameters of not more than 10 μm contained in each aluminum flake pigment was obtained by cutting the said paint plate into 1.5 cm square and smoothly polishing the surface of a sample prepared by embedding the cut paint plate into epoxy resin to be perpendicular to the sample surface thereby preparing an observation sample and observing the states of aluminum flake particles in a section of a paint film with a digital HD microscope VH-7000 (by KEYENCE). In other words, the thickness d and the major axis D of each particle were measured as to the observed flakes on a screen with Image-Pro PLUS ver. 4 (by MEDIA CYBERNETICS).

At this time, the number of aluminum flake particles having major axes D of not more than 10 µm was set to at least 50, for calculating the individual aspect ratios (D/d) of all of the employed at least 50 aluminum flake particles and regarding the mean value thereof as the mean aspect ratio of the aluminum flake particles having diameters of not more than 10 µm contained in each aluminum flake pigment.

While the major axes D observed from the section cannot necessarily be regarded as those expressing the individual major axes of the aluminum flake particles but the individual aspect ratios of the aluminum flake particles calculated on the basis thereof include more or less errors, the mean value of these individual aspect ratios was defined as the mean aspect ratio by setting the number of measurement to at least 50.

As a result of the aforementioned evaluation, the paint films employing paints containing the aluminum flake pigments manufactured by the inventive manufacturing method are remarkably high in brightness at the same mean particle size as compared with comparative examples, and inhibited from sparkling effect in regions having low mean particle sizes.

The embodiment and Examples disclosed this time are to be considered as illustrative and not restrictive in all points. The range of the present invention is indicated not by the above description but by the scope of claim for patent, and intended to include all modifications within the meaning and range as the scope of claim for patent.

INDUSTRIAL AVAILABILITY

From the aforementioned evaluation results, the aluminum flake pigment according to the present invention, which, is an aluminum flake pigment exhibiting high brightness also when the mean particle size is small and inhibited from sparkling effect in a region having a low mean particle size, can be regarded as an aluminum flake pigment extremely excellent in design property.

Therefore, it is understood possible to further flake insufficiently flaked fine aluminum powder by employing a grinder having grinding media containing steel ball grinding media having diameters in the range of 0.3 mm to 1.0 mm in the method of manufacturing an aluminum flake pigment according to the present invention. Accordingly, it can be said that the method of manufacturing an aluminum flake pigment according to the present invention is a method of manufacturing an aluminum flake pigment capable of manufacturing an aluminum flake pigment having a small mean particle size as well as high brightness.

Further, the steel ball grinding media according to the present invention are steel ball grinding media formed by spherical media consisting of a material including steel and having diameters in the range of 0.3 mm to 1.0 mm, and hence it is possible to flake insufficiently flaked fine aluminum powder by employing the grinding media containing steel ball grinding media according to the present invention. Accordingly, it can be said that the steel ball grinding media according to the present invention are steel ball grinding media preferably usable when manufacturing an aluminum flake pigment having a small mean particle size as well as high brightness.

What is claimed is:

1. An aluminum flake pigment comprising an overall content of aluminum flake particles that includes a sub-class of small aluminum flake particles having a maximum dimension of not more than 10 µm, wherein said small aluminum flake particles of said sub-class have a mean aspect ratio in a range of 8 to 20.

2. The aluminum flake pigment according to claim 1, wherein said aluminum flake particles of said overall content have a mean particle size in a range of 3 to 20 µm.

3. The aluminum flake pigment according to claim 2, wherein said mean particle size of said aluminum flake particles of said overall content is in a range of 5 to 15 µm.

4. The aluminum flake pigment according to claim 1, wherein said mean aspect ratio of said small aluminum flake particles of said sub-class is in a range of 9 to 15.

5. The aluminum flake pigment according to claim 1, manufactured by a method including a step of flaking aluminum powder in an organic solvent with a grinder having grinding media containing steel ball grinding media formed by spherical media comprising steel and having diameters in a range of 0.3 mm to 1.0 mm.

6. A combination including the aluminum flake pigment according to claim 1 mixed with an organic solvent and steel ball grinding media having diameters in a range from 0.3 mm to 1.0 mm.

7. The aluminum flake pigment according to claim 1, wherein said mean aspect ratio of said small aluminum flake particles of said sub-class is less than 15.

8. The aluminum flake pigment according to claim 1, wherein said mean aspect ratio of said small aluminum flake particles of said sub-class is less than or equal to 9.4.

9. A metallic paint film on a substrate, said metallic paint film comprising said aluminum flake pigment according to claim 1 contained in a paint composition.

* * * * *

UNITED STATES PATENT AND TRADEMARK OFFICE
CERTIFICATE OF CORRECTION

PATENT NO. : 7,445,667 B2
APPLICATION NO. : 11/820015
DATED : November 4, 2008
INVENTOR(S) : Nagano et al.

It is certified that error appears in the above-identified patent and that said Letters Patent is hereby corrected as shown below:

<u>Title page</u>, following item (62), insert the following item:
--(30)   Foreign Application Priority Data
Sep. 6, 2001  (JP) ..................... 2001-270780--;

<u>Column 2</u>,
Line 44, after "deep", delete ".";
Line 56, after "solvent", delete "-";

<u>Column 5</u>,
Line 12, after "method", delete "-";

<u>Column 8</u>,
Line 8, after "grinding", delete "10";

<u>Column 11</u>,
Line 38, after "which", delete ",".

Signed and Sealed this

Fifteenth Day of September, 2009

David J. Kappos
*Director of the United States Patent and Trademark Office*